United States Patent [19]
von Widdern et al.

[11] Patent Number: 5,985,386
[45] Date of Patent: Nov. 16, 1999

[54] MULTI-LAYER, COEXTRUDED, BIAXIALLY ORIENTED TUBULAR SAUSAGE CASING WITH IMPROVED OXYGEN BARRIER PROPERTIES

[75] Inventors: Michael Hennig-Cardinal von Widdern, Walsrode; Ulrich Reiners, Neuenkirchen, both of Germany

[73] Assignee: Bayer Aktiengesellscaft, Leverkusen, Germany

[21] Appl. No.: 08/968,919

[22] Filed: Nov. 6, 1997

Related U.S. Application Data

[63] Continuation of application No. 08/517,307, Aug. 21, 1995, abandoned, which is a continuation of application No. 08/168,592, Dec. 16, 1993, abandoned.

[30] Foreign Application Priority Data

Dec. 23, 1992 [DE] Germany .............................. 42 43 801
Mar. 1, 1993 [DE] Germany .............................. 43 06 274

[51] Int. Cl.⁶ .......................... B32B 27/30; B32B 27/32; B32B 27/34; A22C 13/00
[52] U.S. Cl. ...................... 428/34.8; 428/35.4; 428/36.6; 428/36.7; 428/220; 428/475.8; 428/476.1; 428/476.3; 428/476.9
[58] Field of Search ................................... 428/34.8, 35.4, 428/36.6, 36.7, 219, 220, 475.8, 476.1, 476.3, 476.9, 910

[56] References Cited

U.S. PATENT DOCUMENTS

| | | | |
|---|---|---|---|
| 4,058,647 | 11/1977 | Inove et al. | 428/474 |
| 4,254,169 | 3/1981 | Schroeder | 428/35 |
| 4,472,485 | 9/1984 | Tabuse et al. | 428/516 |
| 4,892,765 | 1/1990 | Hisazumi et al. | 428/34.8 |
| 5,055,355 | 10/1991 | DeAntonis et al. | 428/476.3 |
| 5,185,189 | 2/1993 | Stenger et al. | 428/34.8 |

FOREIGN PATENT DOCUMENTS

| | | |
|---|---|---|
| 0132565 | 2/1985 | European Pat. Off. . |
| 0248585 | 12/1987 | European Pat. Off. . |
| 0467039 | 1/1992 | European Pat. Off. . |
| 0530538 | 3/1993 | European Pat. Off. . |
| 0530539 | 3/1993 | European Pat. Off. . |
| 0530549 | 3/1993 | European Pat. Off. . |
| 4130485 | 8/1923 | Germany . |
| 3243462 | 6/1983 | Germany . |

*Primary Examiner*—D. S. Nakarani
*Attorney, Agent, or Firm*—Sprung Kramer Schaefer & Briscoe

[57] ABSTRACT

The invention relates to a multi-layer, coextruded, biaxially oriented tubular sausage casing with improved oxygen barrier properties especially for wrapping sausages, which are heat treated after filling.

1 Claim, No Drawings

MULTI-LAYER, COEXTRUDED, BIAXIALLY ORIENTED TUBULAR SAUSAGE CASING WITH IMPROVED OXYGEN BARRIER PROPERTIES

This application is a continuation of application Ser. No. 08/517,307, filed on Aug. 21, 1995, now abandoned, which is a continuation of application Ser. No. 08/168,592, filed on Dec. 16, 1993, now abandoned.

BACKGROUND OF THE INVENTION

The invention relates to a multi-layer, coextruded, biaxially oriented, tubular sausage casing with improved oxygen barrier properties which casing has barrier properties in respect of water vapour and oxygen permeation from the time of filling until removal of the wrapping sufficient for the purposes of sausage storage life and visual appearance. Examples of particularly suitable contents are: boiled sausages.

DESCRIPTION OF THE PRIOR ART

In line with film users' demands for tubular wrapping with elevated water vapour and oxygen barrier properties accompanied by reduced materials usage, a trend has developed in recent years to tailor material properties to requirements by means of multi-layer composite films coextruded from different polymers. Composite films which are, in particular, gaining increasing acceptance are those which, due to the demanded machinability, flexibility and the desire to save raw materials, have a wall thickness between 35 and 70 μm.

Multi-layer, biaxially oriented polyamide/polyolefine composites with diameters of 20 to 150 mm are produced according to the prior art with wall thicknesses of less than 65 μm.

In such film structures, the polyamide not only has the task of ensuring oxygen barrier properties but also of fulfilling requirements for elevated puncture resistance and bursting strength accompanied by appropriate elastic deformability. In such film structures, the polyolefine provides the desired water vapour barrier properties.

Particularly when using such films with contents having an elevated tendency to oxidise, the oxygen barrier layer of polyamide has in the past frequently proved disadvantageous.

As moisture absorption by the polyamide increases, its oxygen barrier properties fall off, which leads in some cases, particularly with moist materials or if the wrapped goods are stored in moist surroundings, to clearly apparent oxidation of the surface of the contents. Since the oxygen permeability of polyamide, as well as being dependent upon water content, is also temperature dependent, oxidation on the surface of the contents has in the past frequently also been observed when sterilisation treatment of longer duration was used.

Apart from the undesirable effect of reduced storage life of the contents due to the action of oxygen, the oxidised surface of the contents looks grey and the packaged goods are perceived by the final consumer as not being fresh and consequently as being unappetising.

The object of the present invention is therefore to provide a biaxially oriented wrapping with improved oxygen barrier properties.

German patent application DE 4 017 046 describes a biaxially oriented coextruded tubular film for use as sausage casing.

It may be gathered from the definition of the 3-layer coextruded casing that the inner layer facing the contents consists of aliphatic and/or aromatic (co-)polyamide, the external layer of aliphatic (co-)polyamide and the central layer of polyolefine with adhesive components.

Apart from insufficient oxygen barrier properties, this film design has a satisfactory range of properties for use as sausage casing. The relatively high oxygen permeability is in particular apparent during the boiling process of contents which are sensitive to oxidation. However, oxygen barrier properties are also insufficient during storage of the packed goods, as moisture from the contents passes into the internal PA layer, so increasing oxygen permeation.

The film structure according to German application DL 1 001 612 exhibits similar weaknesses in terms of oxygen barrier properties.

While the internal and external layers of this biaxially oriented film consist of aliphatic polyamide and/or copolyamide, the central layer of the film includes a partially aromatic (co-)polyamide. The lack of water vapour barrier properties is particularly disadvantageous here in that moisture from the contents penetrates each of the polyamide layers, so increasing their permeability to oxygen.

The object of the invention described below is to provide users with a casing with improved oxygen barrier properties, wherein the reduced oxygen permeation should be satisfactorily retained throughout the entire life of the product, from the filling process until removal of the casing by the final consumer. Stages in the life of the product which are particularly critical and so merit special attention are the heat treatment process in moist surroundings and subsequent storage of the product at room temperature. With known casings made from polyamide/polyolefine composite films, the stated climatic conditions bring about visual and bacteriological deterioration of the contents, particularly those sensitive to oxidation.

SUMMARY OF THE INVENTION

The present invention provides a coextruded, biaxially oriented tubular sausage casing of at least four layers with at least one internal and one external layer substantially consisting of aliphatic polyamide, characterised in that between the internal and external polyamide layers there is present at least one layer substantially consisting of ethylene/vinyl alcohol copolymer and at least one further polymer layer made from polyethylene or polypropylene and/or copolymers based on ethylene or propylene between the internal polyamide layer and at least one the EVOH layer.

Surprisingly, the oxidative processes on the surface of the contents may be appreciably reduced by the inclusion of a thin ethylene/vinyl alcohol (EVOH) copolymer layer. This is all the more surprising since it is known that the barrier action of EVOH layers is extremely dependent upon the moisture content of the EVOH and the temperature of the permeating gas.

A distinct reduction of oxidative processes is discernible with very thin EVOH layers of as little at 2 to 5 μm in thickness, both after the boiling process and after 21 days' storage of the packaged goods.

Obviously, the water vapour barrier layer arranged between the moist contents and the EVOH layer is of particular significance here. This water vapour barrier layer presumably reduces the passage of water vapour from the contents into the EVOH layer sufficiently to ensure that the EVOH layer may dry out after the boiling process. This in turn brings about a reduction in the oxygen permeability of the EVOH layer.

The improved oxygen barrier properties of the casing are particularly striking in testing under industrial conditions of use with contents which are sensitive to oxidation, such as for example liver sausage. The filling and subsequent storage test are in this respect particularly well suited for the characterisation of the improved oxygen barrier properties since, in practice, continually changing climatic conditions until the wrapping is removed by the final consumer scarcely allow the moisture content of the film to reach a steady state. This has the inevitable consequence that the oxygen permeability of the wrapping is constantly changing.

Assessment of the extent of the oxidative processes is made by visual examination of the surface of the contents, wherein colour changes to the peripheral layers of the contents play a particular role.

The biaxially oriented tubular film is preferably produced used the known"double bubble" or the"injected bubble" process in which the extruded primary tube is initially solidified by intensive cooling.

In the remainder of the production process, the relatively thick walled film bubble so obtained (300 to 500 µm) is reheated to a temperature favourable for solid drawing. Reheating may proceed in one or more stages, for example using hot air, steam, temperature-controlled water bath or infra-red radiant heaters.

DESCRIPTION OF PREFERRED EMBODIMENTS

In a preferred embodiment, biaxial drawing is followed by heat setting in one or more stages by means of heat treatment in order to improve dimensional stability of the tubular film. Here too, sources of heat for this purpose are hot air, steam, temperature-controlled fluids and/or infra-red radiant heaters. Due to the rapid, temperature-determined absorption of water by polyamides, heat setting in the presence of water or water vapour additionally softens the polyamide layers, so achieving improved film flexibility.

The biaxially stretched tubular film is preferably wound sing varying winders in order to prevent build-up at the edges by lateral displacement of the film. In a particularly preferred embodiment, the tubular film is additionally rotated around its longitudinal axis so that unavoidable thick spots are not wound on top of each other so causing thick spots on the reel. In another preferred embodiment, the ethylene/vinyl alcohol copolymer has an ethylene content of 20 to 50 wt. % and the degree of saponification of the ethylene/vinyl acetate copolymer starting material is at least 85%. Additionally, the ethylene/vinyl alcohol copolymer may contain as additional olefinic components propylene, 1-butene, 1-pentene or 4-methyl-1-pentene.

Furthermore, the ethylene/vinyl copolymer may be blended with other polymers compatible with the ethylene/vinyl alcohol copoylmers, wherein the proportion by weight of the blended component(s) is less than 50%.

Also, in another embodiment it is preferred that the polymers providing the water vapor barrier properties contain as their main component ethylene or propylene. Particularly preferred is that the polymers providing the water vapor barrier properties are typical adhesives based on ethylene and/or propylene with functional acid groups. Even more preferred is (are) that the polymer layer(s) providing the water vapor barrier consist(s) of a polymer blend of polyethylene or ethylene based copolymers and/or polypropylene or propylene based copolymers and typical adhesives based on ethylene or propylene.

Additionally, it is particularly preferred that the polyamide layers consist of PA 6, PA 11, PA 66 or aliphatic copolyamide PA 6.66, PA 6.8, PA 6.9, PA 6.10, PA 6.11, PA 6.12 a copolymer of the monomer units contained therein or a blend of the above-mentioned aliphatic polyamides/copolyamides.

In a most particularly preferred embodiment the tubular film comprises at least one of the PA layers contains 70 to 95 wt. % of an aliphatic polyamide and/or copolyamide and/or blends thereof and at least one (partially) aromatic PA or copolyamide and/or copolymer based on ethylene or propylene (EVA, EVOH, ionomer resin, acid-modified ethylene or propylene copolymers) and/or (co-)polyester in quantities of at least 3 to at most 30 wt. % related to the total weight of the polymer blend.

Particularly preferred is a tubular film wherein the sum of the thicknesses of all layers in the finished product is between 35 to 70, in particular between 45 to 60 µm.

The subject matter of the invention is more closely illustrated by means of the following examples.

EXAMPLES

The examples described below were performed on a 5-layer tubular blown film coextrusion line. The thermoplastic polymers were plasticised and homogenised, depending on the number of polymer layers, with 4 or 5 separate extruders.

Assessment of different tubular film samples with regard to the quality of oxygen barrier properties was performed by means of testing under industrial conditions of use in order to guarantee that test conditions were relevant to normal practice.

In these comparative tests under industrial conditions of use, the tubular film samples (see evaluation table) are filled with fine liver sausage meat. The wrapped sausages are then boiled for 1.5 hours at a temperature of 105° C. in counter-pressure autoclaves and then further processed using customary procedures.

Proceeding from the objective of improved oxygen barrier properties, the extent of oxidative processes on the surface of the contents is assessed by comparative visual examination using the following procedure:

A: Comparative assessment of grey coloration on the surface of the wrapped sausage:

1. 24 hours after boiling process 2. after 10 days' storage at room temperature (23° C.)

3. after 20 days' storage at room temperature (23° C.)

B: Individual assessment of grey coloration on the surface of the unwrapped sausage by scraping off part of the surface and comparing the colour of the sausage meat between the original surface and the "fresh" surface. The storage conditions and timings of the assessment are the same as for A.

In the following examples, the following abbreviations are used for the polymers used in the coextruded film structures:

A1 Polyamide 6 (Durethan B 38 FKS from Bayer)

A2 Copolyamide 6.66 (Ultramid C 35 from BASF)

A3 partially aromatic polyamide (Nyref MX D6 from Solvay)

B1 Propylene based copolymer with grafted maleic anhydride groups (Admer QF 551 E from Mitsui, PO-AD= polyolefine with adhesive components)

XX1 Ethylene/vinyl alcohol copolymer (EVAL EP-F 101 BZ from Kuraray).

[The number after the full stop, e.g. A1.2, relates to the numbering of the layers of the same polymer, in this example: 2nd layer of Durethan B 38 F, counting from the inside of the film bubble outwards.]

Example 1 [PA6/PO-AD/EVOH/PA6]

A four-layer coextruded molten primary tube emerges from the coextrusion die with the following structure (from the inside outwards)

A1.1/B1.1/XX1.1/A1.2 and is cooled from both inside and outside with water at a temperature of 10° C. and solidified.

After cooling, the primary tube has a diameter of 14 mm and the following distribution of layer thicknesses (from the inside outwards):

A1.1=180 $\mu$m/B1.1=63 $\mu$m/XX1.1=36 $\mu$m/A1.2=135 $\mu$m

The primary tube is then reheated in a stream of air heated to 125° C. and biaxially stretched by a factor of 3 both transversely and longitudinally by inclusion of a bubble of compressed air between two roller pairs producing an airtight seal.

Again between two roller pairs producing an airtight seal, the biaxially stretched film bubble passes through a heat treatment zone heated to 265° C., wherein an internal pressure cushion substantially prevents the diameter being reduced under the action of the heat.

The film obtained in this manner has a diameter of 42 mm and a total film thickness of 46 $\mu$m and is comparatively tested with other film structures according to the procedure laid down above.

Example 2 [PA6.66/PO-HV/EVOH/PO-AD/PA6.66]

Using the same process as in example 1, a five-layer coextruded primary tube is produced with the following structure (from the inside outwards):

A2.1/B1.1/XX1.1/B1.2/A2.2

After cooling, the primary tube has a diameter of 16 mm and the following distribution of layer thicknesses:

A2.1=260 $\mu$m/B1.1=42 $\mu$m/XX1.1=32 $\mu$m/B1.2=42 $\mu$m/A2.2=105 $\mu$m

After being reheated, the primary tube is stretched both transversely and longitudinally by a factor of 3.2 and then heat set.

The finished product has a diameter of 50 mm and a total thickness of 46 $\mu$m.

Example 3 [PA6.66/EVOH/PO-AD/EVOH/PA6.66]

As in the preceding example, a five-layer coextruded primary tube is produced with the following structure (from the inside outwards):

A2.1/XX1.1/B1.1/XX1.2/A2.2

After cooling, the primary tube has a diameter of 16 mm and the following distribution of layer thicknesses:

A2.1=260 $\mu$m/XX1.1=32 $\mu$m/B1.1=60 $\mu$m/XX1.2=32 $\mu$m/A2.2=105 $\mu$m

After being reheated, the primary tube is stretched both transversely and longitudinally by a factor of 3.2 and then heat set.

The finished product has a diameter of 51 mm and a total thickness of 47 $\mu$m.

Example 4 [PA6/PA6.66/PO-AD/EVOH/PA6.66]

As in the preceding examples, a five-layer coextruded primary tube is produced with the following structure (from the inside outwards):

A1.1/A2.1/B1.1/XX1.2/A2.2

After cooling, the primary tube has a diameter of 16 mm and the Following distribution of layer thicknesses:

A1.1=55 $\mu$m/A2.1=210 $\mu$m/B1.1=60 $\mu$m/XX1.2=32 $\mu$m/A2.2=105 $\mu$m

After being reheated, the primary tube is stretched both transversely and longitudinally by a factor of 3.2 and then heat set.

The finished product has a diameter of 51 mm and a total thickness of 44 $\mu$m.

Example 5 [PA6.66/PO-AD/PA6.66/EVOH/PA6.66]

As in the preceding examples, a five-layer coextruded primary tube is produced with the following structure (from the inside outwards):

A2.1/B1.1/A2.2/XX1.1/A2.3

After cooling, the primary tube has a diameter of 16 mm and the following distribution of layer thicknesses:

A2.1=100 $\mu$m/B1.1=50 $\mu$m/A2.2=150 $\mu$m/XX1.1=32 $\mu$m/A2.3=95 $\mu$m

After being reheated, the primary tube is stretched both transversely and longitudinally by a factor of 3.2 and then heat set.

The finished product has a diameter of 51 mm and a total thickness of 42 $\mu$m.

Example 6 [PA6/PO-AD/PA6/EVOH/PA6]

As in the preceding examples, a five-layer coextruded primary tube is produced with the following structure (from the inside outwards):

A1.1/B1.1/A1.2/XX1.1/A1.3

After cooling, the primary tube has a diameter of 14 mm and the following distribution of layer thicknesses: p1 A1.1=45 $\mu$m/B1.1=45 $\mu$m/A1.2=135 $\mu$m/XX1.1=27 $\mu$m/A1.3=180 $\mu$m After being reheated, the primary tube is stretched both transversely and longitudinally by a factor of 3 and then heat set.

The finished product has a diameter of 42 mm and a total thickness of 48 $\mu$m.

Comparative Examples

V1: [PA/PO-AD/PA]

A three-layer coextruded primary tube is produced with the following structure (from the inside outwards):

A2.1/B1.1/A2.2

After cooling, the primary tube has a diameter of 16 mm and the following distribution of layer thicknesses:

A2.1=265 $\mu$m/B1.1=70 $\mu$m/A2.2=130 $\mu$m

After being reheated, the primary tube is stretched both transversely and longitudinally by a factor of 3.2 and then heat set.

The finished product has a diameter of 51 mm and a total thickness of 47 $\mu$m and is comparatively tested with the casings according to the invention (see annex).

V2: [PA/partially aromatic PA/PA]

A three-layer coextruded primary tube is produced with the following structure (from the inside outwards):

A2.1/A3.1/A2.2

After cooling, the primary tube has a diameter of 16 mm and the following distribution of layer thicknesses:

A2.1=265 $\mu$m/A3.1=50 $\mu$m/A2.2=140 $\mu$m

After being reheated, the primary tube is stretched both transversely and longitudinally by a factor of 3.2 and then heat set.

The finished product has a diameter of 51 mm and a total thickness of 46 μm and is comparatively tested with the casings according to the invention (see annex).

V3: [PA 12]

A single layer extruded, unoriented tubular film made from polyamide 12 using the known film blowing process is also included in the comparative testing under industrial conditions of use.

The polyamide 12 is a polymer supplied by Hüls (Vestamid 2106 F).

Presentation of test results:

A. Comparative assessment of grey coloration on the surface of the wrapped sausages

|         | Length of storage | | |
|---------|-------|---------|---------|
| Example | 1 day | 10 days | 20 days |
| 1  | 0 | 0 | 0 |
| 2  | 0 | 0 | 0 |
| 3  | 0 | 0 | 0 |
| 4  | 0 | 0 | 0 |
| 5  | 0 | 0 | 0 |
| 6  | 0 | 0 | 0 |
| V1 | 0 | 1 | 2 |
| V2 | 0 | 1 | 2 |
| V3 | 2 | 2 | 2 |

0 = no discernible grey coloration of sausage meat
1 = slightly discernible grey coloration of sausage meat
2 = clearly discernible grey coloration of sausage meat B: Individual assessment of grey coloration by scraping off part of the surface

|         | Length of storage | | |
|---------|-------|---------|---------|
| Example | 1 day | 10 days | 20 days |
| 1  | 0 | 0 | 0 |
| 2  | 0 | 0 | 0 |
| 3  | 0 | 0 | 0 |
| 4  | 0 | 0 | 0 |
| 5  | 0 | 0 | 0 |
| 6  | 0 | 0 | 0 |
| V1 | 0 | 2 | 2 |
| V2 | 0 | 2 | 2 |
| V3 | 2 | 2 | 2 |

0 = no discernible grey coloration of sausage meat
1 = slightly discernible grey coloration of sausage meat
2 = clearly discernible grey coloration of sausage meat

We claim:

1. A coextruded, biaxially orientated, tubular sausage casing of a total of 35 to 70 μm thick and which comprises a laminate of at least four layers with at least one interior layer of said casing denoted (A), one external layer of said casing denoted (D), between said layers (A) and (D) at least one layer (B) and at least one further polymer layer (C)

wherein layers (A) and (D) consist essentially of an aliphatic polyamide 6, polyamide 11, polyamide 6.6, aliphatic copolyamide of polyamide 6 and polyamide 6.6, polyamide 6.8, polyamide 6.9, polyamide 6.10, polyamide 6.11, polyamide 6.12, a copolymer of the monomer units contained therein, or a blend of the above-mentioned aliphatic polyamides or copolyamides; wherein at least one of the polyamide layers contains 70 to 95 wt. % of an aliphatic polyamide, copolyamide, or blend thereof, and from 3 to 30 wt. % related to the total weight of the polymer blend of at least one partially aromatic polyamide or copolyamide, copolymer based on ethylene or propylene, polyester, copolyester, or blends thereof, water vapor barrier layer (C) comprises a homopolymer or copolymer of ethylene or propylene between interior polyamide layer A and layer B, the homopolymer or copolymer layer (C) comprising ethylene or propylene in major amount and containing functional acid groups, and layer B consists essentially of ethylene/vinyl alcohol copolymer having an ethylene content of 20 to 50 wt. % and resulting from at least 85% saponification of an ethylene/vinyl acetate copolymer starting material, the ethylene/vinyl alcohol copolymer optionally containing an additional olefinic component selected from the group consisting of propylene, 1-butene, 1-pentene and 4-methyl-1-pentene; or the ethylene/vinyl alcohol copolymer being blended with another polymer compatible therewith, which other polymer is present in less than 50% by weight of the blend, said laminate being biaxially oriented to a draw ratio of 9–10.24.

* * * * *